United States Patent
Nakamura et al.

(10) Patent No.: US 7,788,636 B2
(45) Date of Patent: Aug. 31, 2010

(54) SYSTEM AND METHOD FOR DERIVING STOCHASTIC PERFORMANCE EVALUATION MODEL FROM ANNOTATED UML DESIGN MODEL

(75) Inventors: Hiroaki Nakamura, Yokohama (JP); Naoto Sato, Kawasaki (JP); Naoshi Tabuchi, Machida (JP)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 11/608,103

(22) Filed: Dec. 7, 2006

(65) Prior Publication Data
US 2007/0150875 A1  Jun. 28, 2007

(30) Foreign Application Priority Data
Dec. 27, 2005  (JP)  ............... 2005-374835

(51) Int. Cl.
G06F 9/44  (2006.01)
(52) U.S. Cl. .................. 717/104; 717/106; 717/109; 717/125; 717/133
(58) Field of Classification Search .................. 717/104
See application file for complete search history.

(56) References Cited

U.S. PATENT DOCUMENTS

| 6,601,233 | B1 * | 7/2003 | Underwood ............. 717/106 |
| 7,509,629 | B2 * | 3/2009 | Sakamoto et al. ......... 717/105 |
| 2004/0143819 | A1 * | 7/2004 | Cheng et al. ............ 717/125 |
| 2006/0106626 | A1 * | 5/2006 | Jeng et al. .............. 705/1 |
| 2009/0132995 | A1 * | 5/2009 | Iborra et al. ............ 717/106 |

FOREIGN PATENT DOCUMENTS

JP  2001318812  11/2001

OTHER PUBLICATIONS

Egyed et al. "Rose/Architect: a tool to visualize architecture" 1999, Proceedings of 32nd Hawaii International Conference on System Sciences.*
Canevet et al., "Analysing UML 2.0 activity diagrams in the software performance engineering process", The University of Edinburgh, Scotland, 5 pages.
Gilmore et al., "A unified approach to performance modelling and verification", The University of Edinburgh, Edinburgh Scotland, 25 pages.
Bernardi et al., "From UML Sequence Diagrams and Statecharts to analysable Petri Net models", WOSP 02, Jul. 24-26, 2002, ACM ISBN 1-1-58113-563-7, pp. 35-45.

(Continued)

*Primary Examiner*—Thomas K Pham
(74) *Attorney, Agent, or Firm*—Yee & Associates, P.C.; Josh G. Cockburn

(57) ABSTRACT

The computer program enables a computer to function as: means for transforming a static call graph into a syntax tree having a binary tree structure; means for transforming a protocol state diagram into a stochastic process algebraic form; means for transforming an activity diagram into a stochastic process algebraic form; means for obtaining a stochastic process algebraic form of each of classes by merging the stochastic process algebraic form of the protocol state diagram, and the stochastic process algebraic form of the activity diagram; and means for obtaining a stochastic algebraic form of a whole system from the syntax tree, and from the stochastic process algebraic forms of the classes.

15 Claims, 12 Drawing Sheets

OTHER PUBLICATIONS

Lopez-Grao et al., "From UML Activity Diagrams to Stochastic Petri Nets: Application To Software Performance Engineering", WOSP 04, Jan. 14-16, 2004, ACM ISBN 1-58113-673-0/04/0001, 12 pages.

Merseguer et al., "Exploring roles for the UML diagrams in software performance engineering", University of Zaragoza, Zaragoza, Spain, 5 pages.

* cited by examiner

SYSTEM AND METHOD FOR DERIVING STOCHASTIC PERFORMANCE EVALUATION MODEL FROM ANNOTATED UML DESIGN MODEL

BACKGROUND OF THE INVENTION

The present invention relates to an apparatus and a program which, by using a design model as an input in each processing step in a processing flow described in UML (Unified Modeling Language), automatically derive from the design model a mathematical model for quantitative performance evaluation, the design model being annotated with respect to basic performance indices.

For the purpose of estimating and verifying quantitative quality of a system, several formal techniques, such as a timed stochastic Petri net, and a timed stochastic process algebra, have been established. A Petri net and a process algebra are both formal techniques capable of naturally expressing a control flow such as software. For each of these techniques, a plurality of extensions, to which information regarding processing time is added, have been proposed. Analytical techniques on the basis of mathematical formalizations have been established based on these extended descriptions, the mathematical formalizations including: a stochastic process such as a Markov chain; and a timed automaton. Thereby, tools applicable to performance evaluation for a system have been developed.

Apart from the aforementioned formal techniques, a UML extension specification called "UML Profile for Schedulability, Performance and Time (UML-SPT)" has been standardized in the OMG (Object Management Group). This is a specification for describing annotations regarding a processing time and performance. By performing relatively formal and uniform descriptions regarding estimation of a necessary processing time, and regarding other performance indices for an entire system or for a particular processing step by use of annotations complying with UML-SPT, reciprocal communications on these pieces of information can be encouraged among developers.

As existing studies related thereto, in each of the following documents: S. Gilmore and L. Kloul, "A unified approach to performance modeling and verification," May 2003, a paper presented at Dagstuhl seminar on "Probabilistic Methods in Verification and Planning"; and C. Canevet et al., "Analysing UML 2.0 activity diagrams in the software performance engineering process," in Proc. 4th Intl. Workshop on Soft. and Perf., pages 74 to 78, 2004, a performance evaluation model based on the process algebra is automatically derived from a state diagram, and an activity diagram, of UML. In each of these techniques, however, only a method of deriving one evaluation model from one diagram is mentioned, and an activity expressed by linkage of a plurality of diagrams is not taken into consideration. In each of the following three documents: Simona Bernardi et al., "From UML sequence diagrams and statecharts to analysable petri netmodels" in Proc. 3rd Intl. Workshop on Software and Performance, pages 35 to 45, 2002; Juan Pablo López Grao et al., "From UML activity diagrams to stochastic petri nets: application to software performance engineering," SIGSOFT Softw. Eng. Notes, 29(1), 2004; and José Merseguer and Javier Campos, "Exploring roles for the UML diagrams in software performance engineering," in Proc. 2003 Intl. Conf. on Software Engineering Research and Practice (SERP'03), pages 43 to 47, June 2003, InternalNote: Submitted by: jcampos@unizar.es, a transformation technique into a Petri net is described, the transformation technique taking linkage among an activity diagram, a state diagram, a use case diagram, and the like into consideration. In this technique, a relation of linkage such as that "an activity diagram A calls an activity diagram B" is expressed as a connection of topologies of the Petri net. In this technique, however, behavior of an activity being called cannot express a case, such as a function call, which depends on parameters given by a side calling the other. Additionally, while it is a generally practice in actual system developing processes that a plurality of constituent elements which behave alike are expressed with a relation of "a class and instances", such a relation cannot be expressed in this technique.

While Japanese Patent Official Gazette No.2001-318812 relates to a technique whereby a performance evaluation model is automatically derived from an annotated UML model, it has a problem that, since it takes only class diagrams and part of sequence diagrams into consideration, the performance model is not made into details. Additionally, this problem involves a risk of bringing about a state where behavior of the UML model is not consistent with behavior of the derived performance evaluation model. In order to correct this state, it is required for an engineer to perform work such as addition of parameters.

In order for an engineer, who has no expert knowledge, to make performance evaluation based on UML, the engineer requires a technique whereby a performance evaluation model is automatically derived from a UML model. Additionally, because component-based modeling using classes is generally practiced in actual developing processes using UML, such actual developing processes have to be taken into consideration. Use of modeling based on UML and use of annotations based on UML-SPT and the like are considered advantageous. In the specification of UML-SPT, however, while locations and a format in describing annotations are determined, strict meanings of the annotations are not defined. Therefore, it is not necessarily possible to obtain performance evaluation from added annotations.

SUMMARY OF THE INVENTION

In the present invention, a computer program which transforms a UML design model into a stochastic performance evaluation model is provided in order to solve the abovementioned problems. The computer program causes a computer to function as: means for transforming a static call graph into a syntax tree having a binary tree structure; means for transforming a protocol state diagram into a stochastic process algebraic form; means for transforming an activity diagram into a stochastic process algebraic form; means for obtaining a stochastic process algebraic form of each of classes by merging the stochastic process algebraic form of the protocol state diagram, and the stochastic process algebraic form of the activity diagram, into one; and means for obtaining a stochastic process algebraic form of an entire system from the syntax tree, and from the stochastic process algebraic forms of the classes. By the computer program, even an engineer having no expert knowledge can easily derive a performance evaluation model from a UML model.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENT

Although the present invention will be described hereinafter by way of embodiments of the invention, the following embodiments do not limit the invention according to the scope of claims. Additionally, among combinations of characteristics described in the embodiments, there may be ones provided for facilitating the understanding of contents of the invention, and it is not necessarily the case that all of the combinations are essential to solving means for the invention.

Although a system and a method will be mainly described in the following embodiments, the present invention can be implemented also as a program usable in a computer as is apparent to those skilled in the art. Accordingly, the present invention can assume an embodiment in the form of hardware, an embodiment in the form of software, and an embodiment in the form of a combination of hardware and software. The program can be recorded in any computer-readable medium such as a hard disk, a CD-ROM, an optical recording device or a magnetic recording device.

Figure 1:
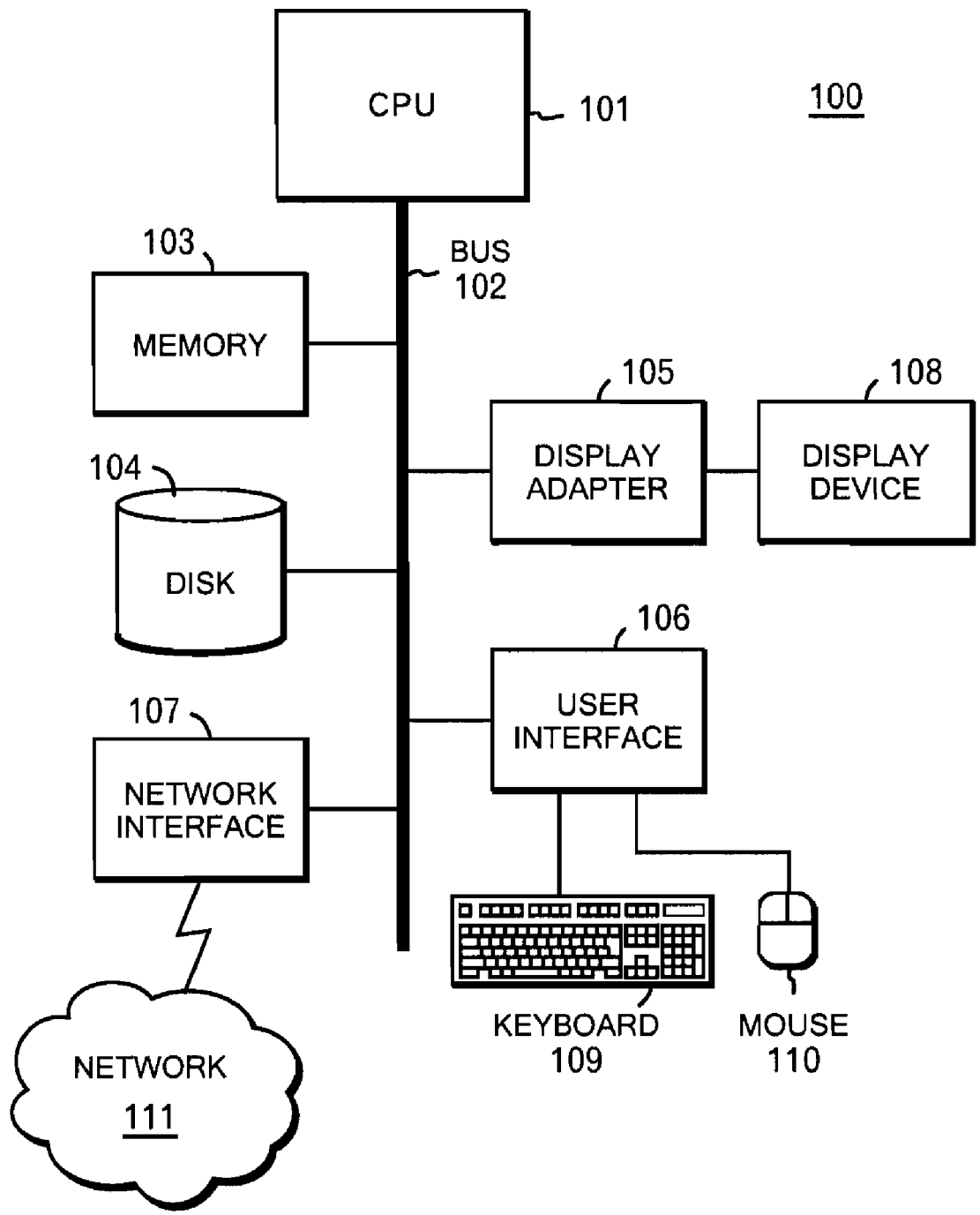
FIG. 1 shows an outline of a hardware configuration 100 whereby a system, which derives a stochastic performance evaluation model from a UML design model, operates.

FIG. 1 shows an outline of a hardware configuration 100 whereby a system, which derives a stochastic performance evaluation model from a UML design model, operates. A CPU 101 which is a central processing unit executes various programs under control of various operating systems. The CPU 101 is mutually connected to a memory 103, a disk 104, a display adapter 105, a user interface 106 and a network interface 107 through a bus 102. Note that the network interface 107 is not an essential constituent element, but becomes necessary in a case where a distributed environment is implemented in the present invention. Software and operating systems for causing a computer to function as a system realizing the present invention, and a program for executing the present invention are included in the disk 104.

The CPU 101 is connected: to a keyboard 109 and a mouse 110 through the user interface 106; to a display device 108 through the display adapter 105; and to a network 111 through the network interface 107. Note that this hardware configuration 100 is only an example of one embodiment of a computer system, a bus arrangement and a network connection. Characteristics of the present invention can also be realized in an embodiment formed of various system configurations each including a plurality of identical constituent elements, or in an embodiment where the various system configurations are further distributed on a network.

Figure 2:
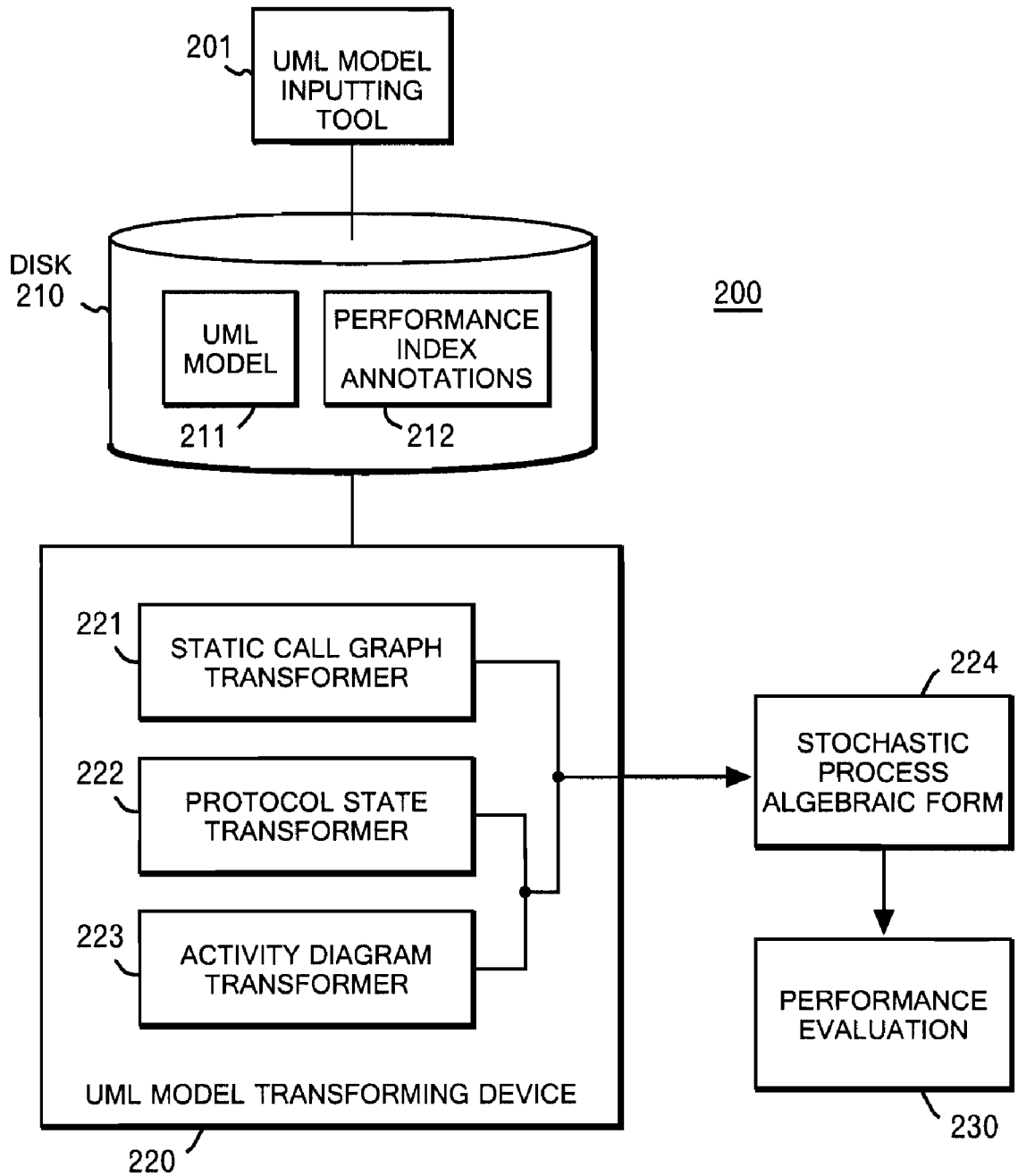
FIG. 2 shows functions and data of the system which derives a stochastic performance evaluation model from a UML design model.

FIG. 2 conceptually expresses functions and data of the system which derives a stochastic performance evaluation model from a UML design model. Reference numeral 201 denotes a tool through which a UML model is inputted. There is a UML-STP model having been registered in a disk 210. Contents of the UML-SPT model in the disk 210 are a UML model 211, performance index annotations 212, and the like. Reference numeral 220 denotes a UML model transforming device which transforms a UML model into stochastic process algebraic form. The UML model transforming device 220 includes a static call graph transformer 221, a protocol state transformer 222, and an activity diagram transformer 223. The static call graph transformer 221 transforms a static call graph into a syntax tree having a binary-tree structure, whereby a process algebraic form expression is found. The protocol state transformer 222 produces a process algebraic form from a protocol state diagram. The activity diagram transformer 223 produces a process algebraic form from an activity diagram in UML 2.0 which describes specific behavior of a method. Finally, the process algebraic forms obtained respectively from the protocol state diagram and from the activity diagram are merged into one, which is further merged with the syntax tree having the binary-tree structure, whereby a stochastic process algebraic form 224 is found. Thereafter, performance evaluation of the system is performed (230) in a manner that the stochastic process algebraic form 224 is transformed from the stochastic process algebraic expression into a model of a continuous Markov chain by means of a stochastic model transformation, or transformed by some other transforming mechanisms.

Figure 3:
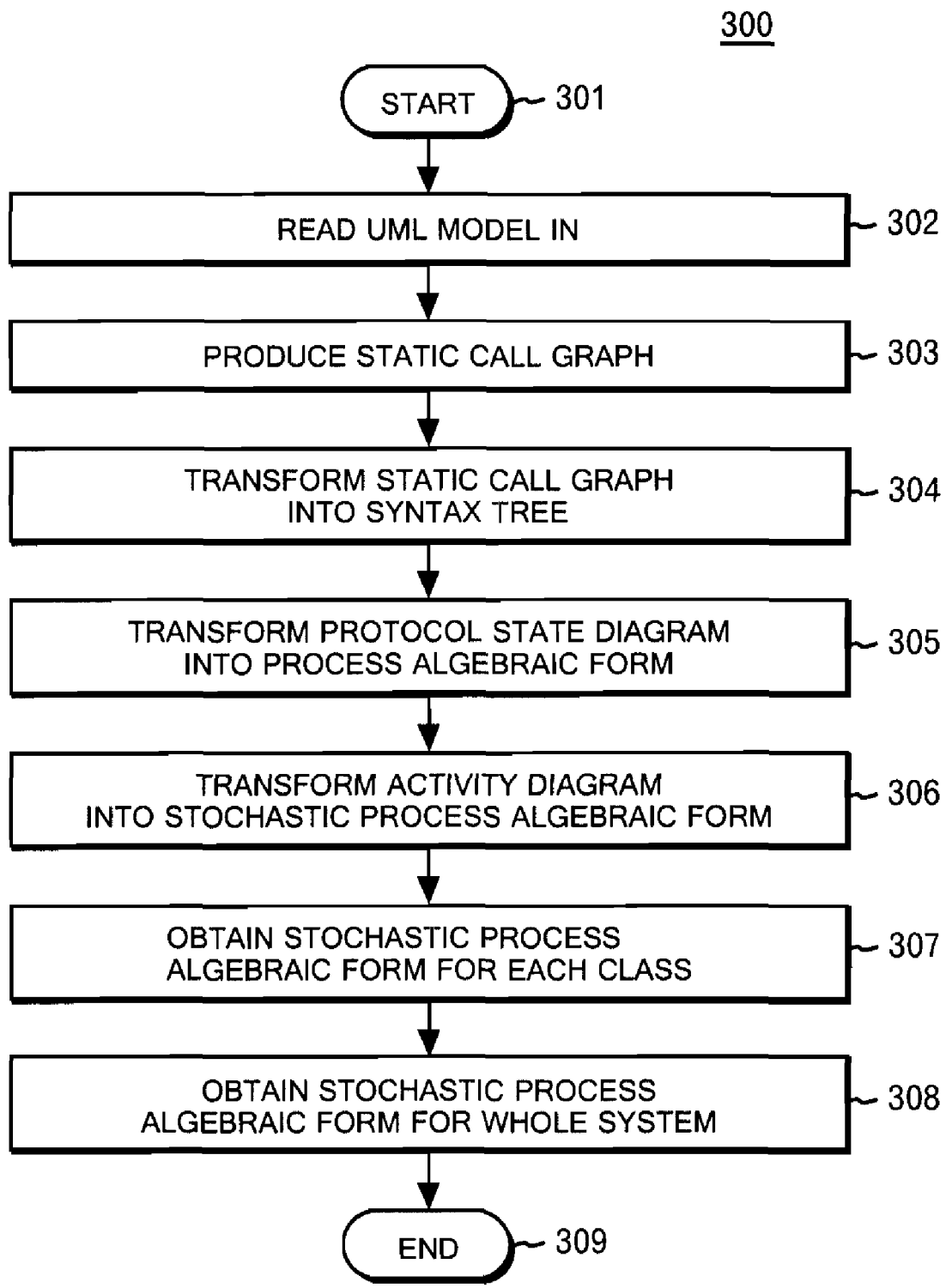
FIG. 3 illustrates a processing flow 300 in which a stochastic performance evaluation model is derived from a UML design model.

FIG. 3 illustrates a processing flow 300 in which a stochastic performance evaluation model is derived from a UML design model. The processing is started in Step 301. In Step 302, a UML model is read in. This UML model is a UML-STP, and includes a UML design diagram and annotations on performance indices. In Step 303, a static call graph of each of classes is produced. Note that, since a "CallOperationAction" expressing a call to a method of another class is included among constituent elements of an activity diagram defined in compliance with the specification of UML 2.0, it is possible to produce the static call graph of each class by extracting a linkage relation among the classes based on this "CallOperationAction." In Step 304, the static call graph is transformed into a syntax tree having a binary-tree structure. In Step 305, a protocol state diagram is transformed into a stochastic process algebraic form. In Step 306, the activity diagram is transformed into a stochastic process algebraic form. In Step 307, a stochastic process algebraic form for the each class is obtained by merging the stochastic process algebraic form obtained from the protocol state diagram in Step 305, and the stochastic process algebraic form obtained from the activity diagram in Step 306, into one. In Step 308, a stochastic process algebraic form for a whole system is obtained from the syntax tree obtained in Step 304, and the stochastic process algebraic forms obtained by the merging in Step 307 for the classes. The processing is ended in Step 309.

Figure 4:
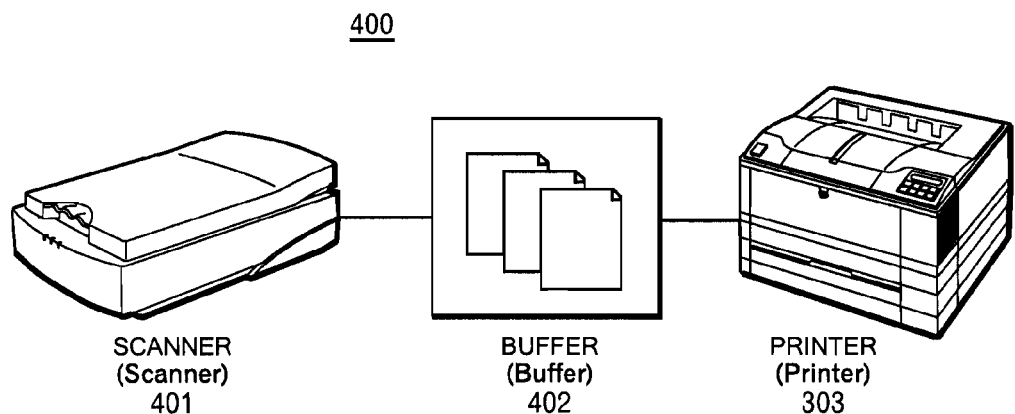
FIG. 4 illustrates a system 400 for which a process algebraic form is derived.
Figure 5:
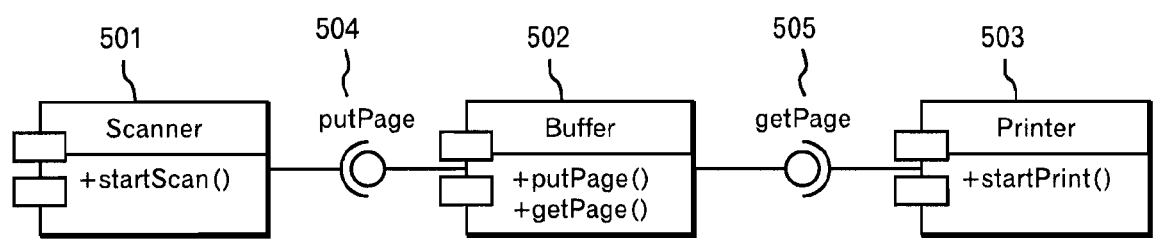
FIG. 5 is an example of UML models of the system 400.
Figure 6:
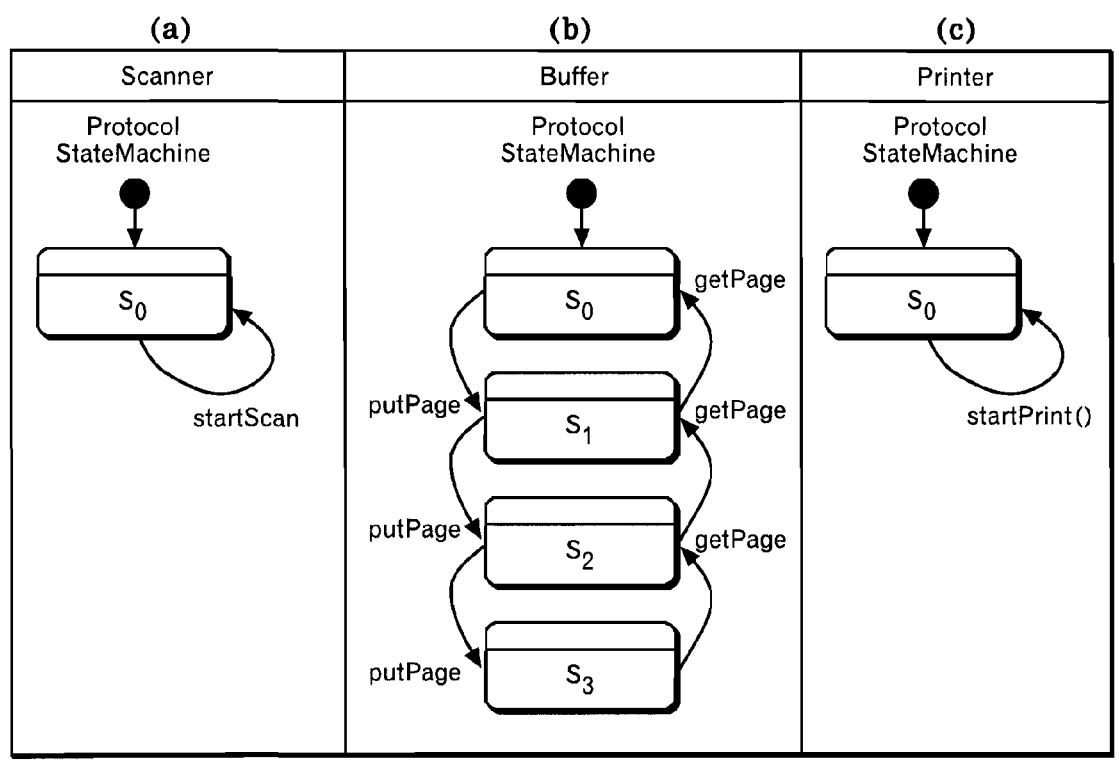
FIG. 6 shows a protocol state diagram for each of components.
Figure 7:
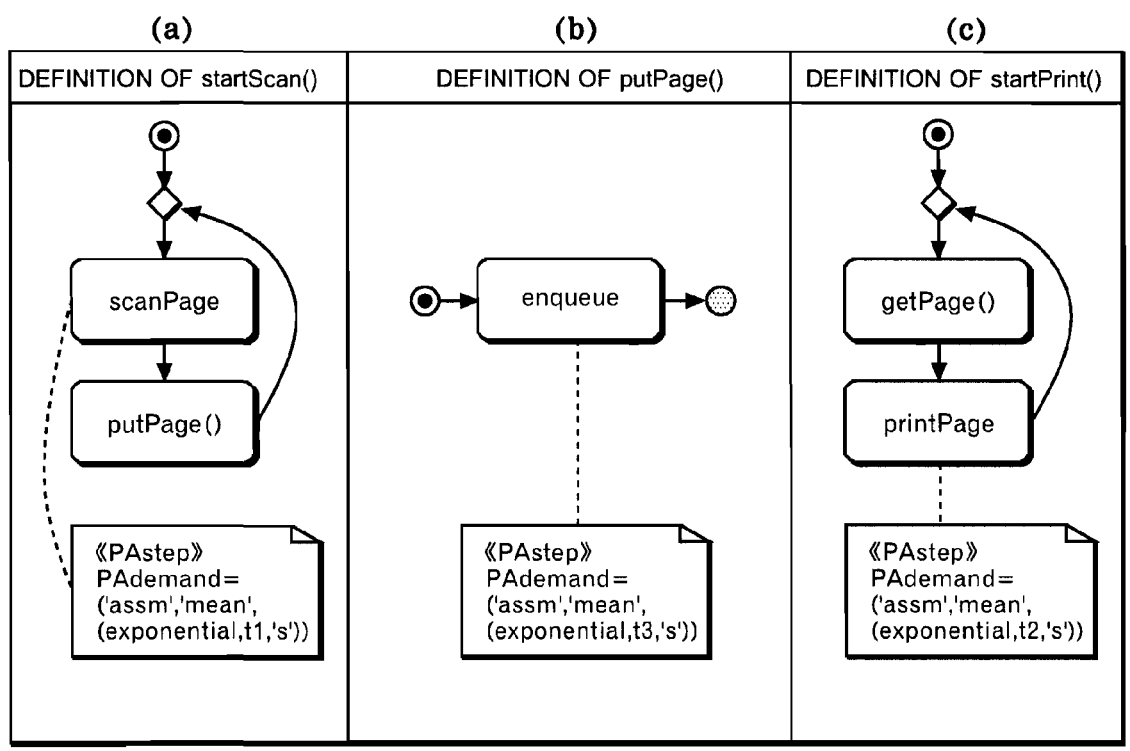
FIG. 7 shows an activity diagram defining each of methods.

FIG. 4 illustrates a system 400 for which the process algebraic form is derived by using the configuration of FIG. 2.

FIG. 4 shows the system 400 with reference numerals 401, 402 and 403 respectively denoting a scanner (Scanner), a buffer (Buffer) and a printer (Printer). Note that the system 400 in FIG. 4 is one example to which the present invention is applied, and an applicable scope of the present invention is not limit thereto. In the system 400, data of a document scanned by the scanner 401 are stored in the buffer 402, and the printer 403 retrieves and prints out the data in the buffer 402. The system 400 is a system which performs parallel operations since the scanner 401 and the printer 403 operate mutually independently. Additionally, it is assumed that the buffer 402 in this case is capable of retaining data for three pages of the document.

FIGS. 5 to 7C are examples of UML models, the examples each indicating a structure and behavior of the system 400 of FIG. 4. The UML model in FIG. 5 defines three components (classes), which are a scanner 501, a buffer 502 and a printer 503. The scanner 501 is coupled with the buffer 502 by means of an interface which is a putPage method 504, and the printer 503 is coupled with the buffer 502 by means of an interface which is a getPage method 505. Additionally, the scanner 501 owns a startScan method, and the printer 503 owns a startPrint method.

FIGS. 6A to 6C show protocol state diagrams for the respective components. A protocol state diagram denotes a state transition diagram having method names as state transition labels. For example, when a transition from a state S1 to a state S2 exists in the state transition diagram, and is labeled with a label f, it indicates that states of a class change from S1 to S2 with a call to a method f. In the protocol state diagram (FIG. 6A) for the scanner, it is indicated that a call to the startScan method is accepted for an arbitrary number of times. Likewise, in the protocol state diagram (FIG. 6C) for the printer, it is indicated that a call to the startPrint method is accepted for an arbitrary number of times.

On the other hand, the protocol state diagram (FIG. 6B) for the buffer has four states S0, S1, S2 and S3 in addition to an initial state. The state Si indicates a state where i pieces of data are retained in the buffer. States of the buffer transition from Si to Si+1 each time when the putPage method is called, and transition from Si to Si−1 each time when the getPage method is called. Since the state S0 is a state indicating that the buffer is empty, the buffer cannot accept a call to the getPage method in this state. If the printer calls the getPage method in the state S0, this call is kept waiting until the state of the buffer transitions to the state S1 or a later state. Likewise, since the state S3 is a state where the buffer is filled up with the data, the buffer cannot accept a call to the putPage method in the state S3.

FIGS. 7A to 7C are activity diagrams defining the respective methods. In FIG. 7A, the startScan method of the scanner is configured as a loop where two actions, which are a scanPage action, and an action which calls the putPage method of the buffer, are repeated. Here, the scanPage action is annotated, in a notation in UML-SPT (a stereotype <<PAstep>> defined in UML-SPT), with respect to a time required for executing this action. This annotation indicates that execution of the scanPage action requires a time of t1 seconds on average, and that dispersion in the execution times follows an exponential distribution (exponential). In FIG. 7C, for the printPage method of the printer, repetition of two actions, which are a call to the getPage method, and a printPage action, is likewise expressed as the activity diagram, and the printPage action is annotated so as to indicate that execution of the printPage action requires a time of t2 seconds on average. In FIG. 7B, in the buffer, an enqueue action of the putPage method requires a time of t3 seconds on average.

Since the getPage method is substantially equal to the putPage method, a description on the getPage method is omitted here.

Hereinafter, a method of deriving a specific process algebraic form will be described. A "CallOperationAction" expressing a call to a method of another class is included among constituent elements of an activity diagram defined in the specification of UML 2.0. In the present invention, a linkage relation among classes is extracted based on the CallOperationActions included in an inputted UML model, and is transformed into an algebraic form expressing communications between processes of stochastic process algebraic forms. The linkage relation among the classes is extracted in a manner that a relation between calling one and called one among the classes is expressed as a static call graph by: listing, for the respective classes included in the inputted UML mode, the CallOperationActions contained in activity diagrams belonging to the respective classes; and determining which class is called. Note that, while there is a tool for extracting a static call graph from a source program in the C language, the linkage relation among the classes can be extracted by applying the same scheme as this to UML.

Definitions of process algebraic forms used in the present invention are shown in Table 1. Note that "P|LQ" denotes an activity where two processes P and Q synchronize each other in an action appearing in L while operating in parallel, and is a syntax element for expressing linkage among the classes.

TABLE 1

| | |
|---|---|
| $\Sigma ::= \tau, a, b, c, \ldots$ | untimed action |
| $\Sigma' ::= a', b', c', \ldots$ | untimed action (forming a pair with $\Sigma$) |
| P ::= stop | finalizing process |
| \| (r).P | timed action |
| \| $\alpha$.P | untimed action   prefix, $\alpha \in \Sigma \cup \Sigma'$ |
| \| P + Q | selection |
| \| P\|$_L$Q | parallel connection :L $\subset \Sigma$ |
| \| X | process variable |
| \| $\mu$X.P | recursion |

In the process algebra used in the present invention, communications between processes are each expressed as a syntax tree having a binary-tree structure, and are each performed based on a name of an action. On the other hand, linkage based on the CallOperationAction in a UML model generally assumes a form of a graph structure, and there may be a case where a method of a single name is called by different arguments. For this reason, a first procedure of transformation into a process algebraic form from a static call graph extracted from a model is an operation where: (i) different names of actions are assigned to calls of the respective methods; and (ii) a graph structure is transformed into a binary-tree structure.

Figure 8:
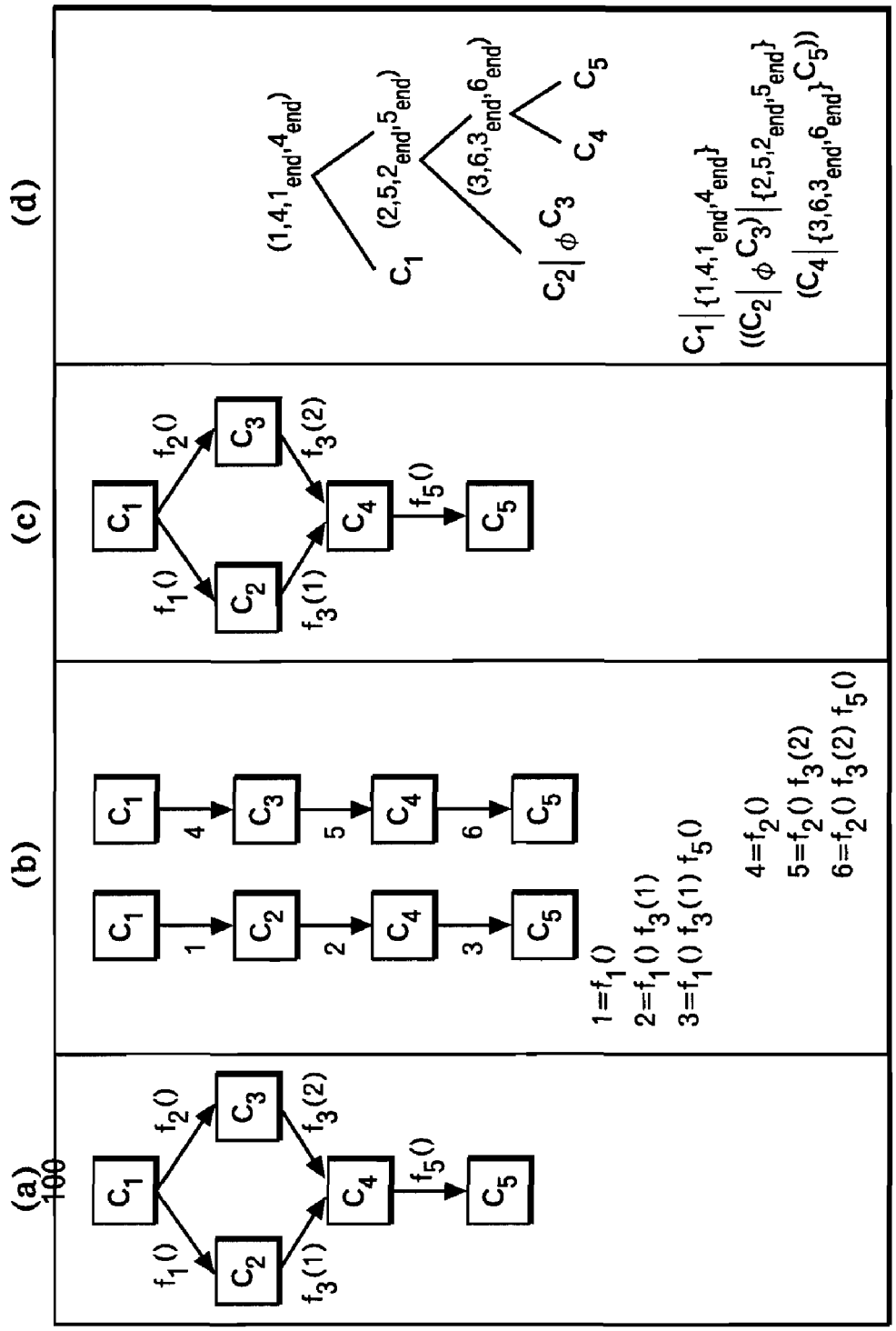
FIG. 8 shows an example of a process of transforming a static call graph into a process algebraic form.

FIGS. 8A to 8D show an example for facilitating the understanding of processes in the course of transforming a static call graph into process algebraic forms. In FIG. 8A, a static call graph formed of 5 classes C1 to C5 and 5 methods f1 to f5 is shown. Here, the method f3 is called from the class C2 and from the class C3 respectively by means of different arguments. In this graph, the class C1 is called by none of the classes. Hereinafter, such a node in a static call graph will be referred to as a "root" of the graph. On the other hand, the class C5 does not call a method of any one of the other classes. Hereinafter, such a node will be referred to as a "leaf" of the graph. Generally, in the static call graph, a root and a leave may respectively exist in plurality.

Figure 9:
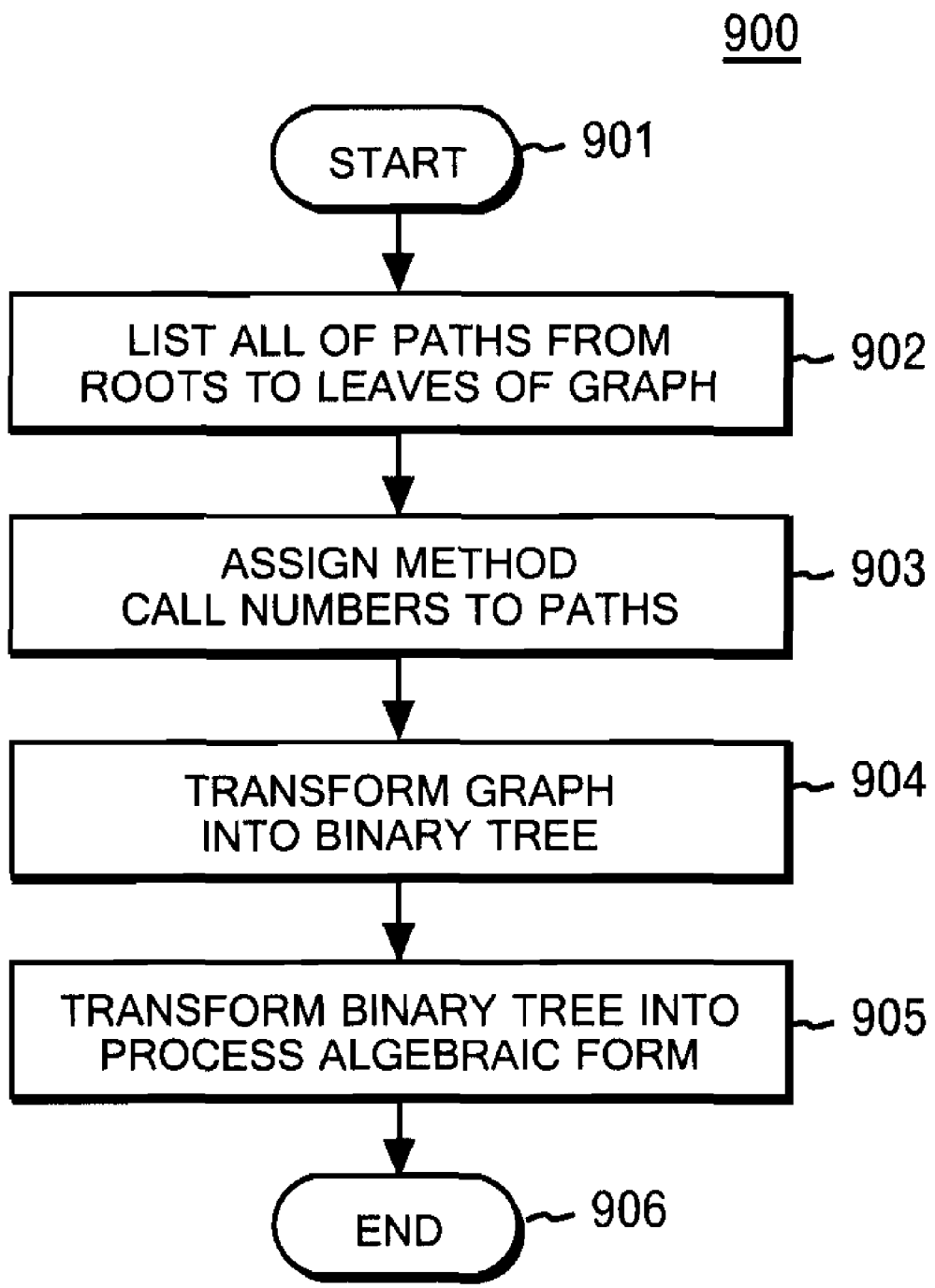
FIG. 9 shows an example of a process of transforming a static call graph into a process algebraic form.

FIG. 9 is a processing flow 900 representing an example of a process in the course of transforming a static call graph into a process algebraic form. The processing flow 900 starts processing in Step 901. In Step 902, all of paths respectively starting from roots and reaching leaves of the graph are listed. In Step 903, to each of branches of the paths listed in Step 902, a "method call number" which is a unique identification number is assigned. At this time, a correspondence relation of the method call numbers and classes calling methods is retained (FIG. 8B). By the processing until this, a plurality of numbers is assigned to a single method in a manner that a difference in arguments and in call paths of the method in the original static call graph is distinguished. That is, in this course of transforming the static call graph into the process algebraic form, the differences in arguments and in call paths of methods in the original static call graph is reflected. For example, when the graph structure in FIG. 8C and the corresponding relation in FIG. 8B are considered, numbers 2 and 5 are assigned to two calls calling the method f3, and numbers 3 and 6 are assigned to two calls calling the method f5. In Step 904, the graph obtained by the above processing is transformed into a binary tree corresponding to process algebraic forms. This binary tree becomes a tree having, as data, a group where: each leaf element has a parallel connection of processes "N1|ϕ . . . |ϕRk"; and nodes other than the leaf elements have two names i, iend with respect to each i of the method call numbers. Here, the name i is an action name representing start of a method corresponding to the method call number i, and the name i end is an action name representing end of the same method. Since there is one-to-one correspondence between this binary tree and a syntax tree of the process algebraic forms representing the parallel connection among the classes, the binary tree is transformed into a process algebraic form in Step 905 (FIG. 8D)

Figure 10:
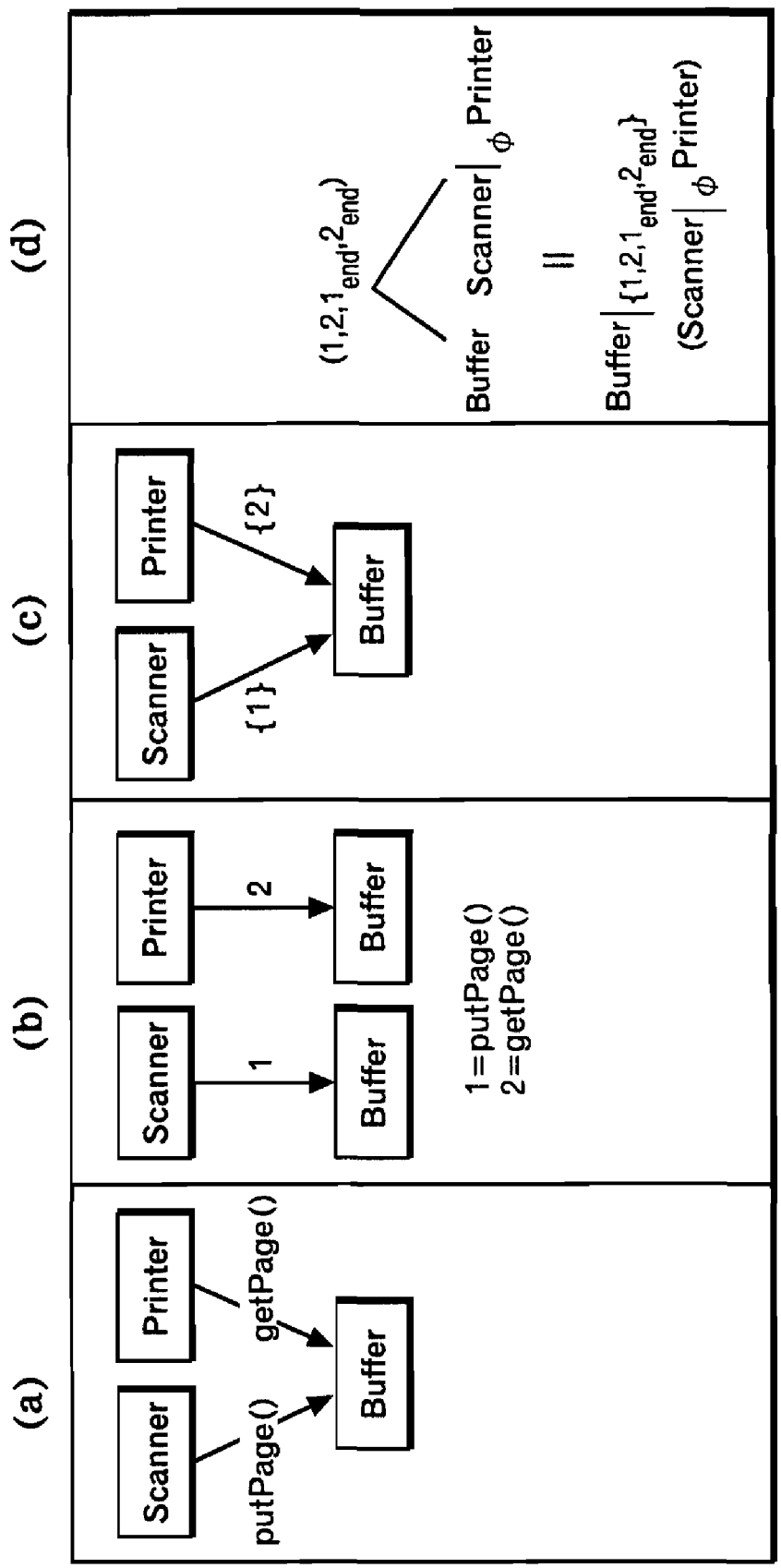
FIG. 10 shows, with respect to the system 400, an example of a process of transforming a static call graph into a process algebraic form.

FIGS. 10A to 10D are an example where the same processing as shown in FIGS. 8A to 8C and 9 is applied to the system 400 of FIG. 4. FIG. 10A is a static call graph formed of: three classes which are Scanner, Buffer and Printer; and two methods which are putPage and getPage methods. In FIG. 10B, method call numbers 1 and 2 are assigned respectively to a call to the putPage method from Scanner to Buffer, and a call to the getPage method from Printer to Buffer. In FIG. 10C, method names in FIG. 10A are replaced by method call numbers corresponding thereto. FIG. 10D is obtained by transforming the expression in FIG. 10C into a binary-tree expression, and the following process algebraic form expression is obtained:

Buffer|{1, 2, 1 end, 2 end} (Scanner|ϕPrinter).

Transformation of classes into process algebraic forms is performed based on the following procedure. (i) A protocol state diagram defining behavior of each class is transformed into a process algebraic form; (ii) an activity diagram defining behavior of each methods owned by the each class is transformed into a process algebraic form; and (iii) a process algebraic form expressing behavior of each class is obtained by merging the results of (i) and (ii) in the above.

Figure 11:
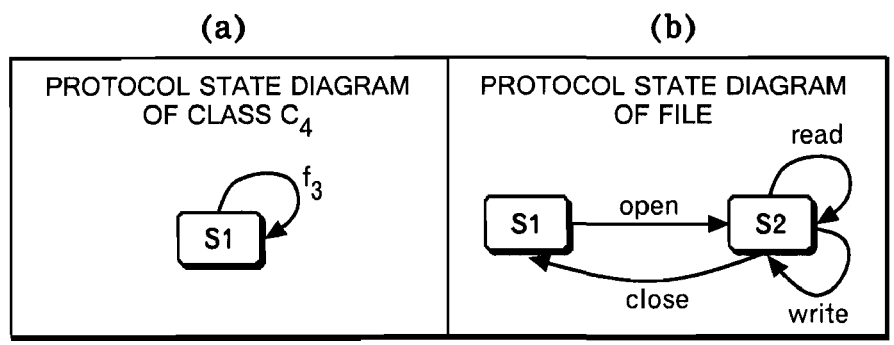
FIG. 11 shows example of a protocol state diagram.

Transformation of a protocol state diagram into a process algebraic form is described in each of FIGS. 11A and 11B. The protocol state diagram is a state transition diagram having method names as state transition labels. In the state transition diagram, when a transition from a state S1 to a state S2 exists, and is labeled as a label f, it indicates that states of a class change from S1 to S2 with a call to a method f. In this manner, it becomes possible to express kinds and a sequence of method calls which can be accepted by the class represented by the protocol state diagram. For example, FIG. 11A is a protocol state diagram of the class C4 of FIGS. 8A to 8D, and indicates that the class C4 accepts a call to the method f3 for an arbitrary number of times. As a more complicated example, FIG. 11B is a protocol state diagram of a class representing a "file." The diagram expresses that the "file" first accepts a method "open," then accepts a method "close" after a method "read" or "write" for an arbitrary number of times, and returns to an initial state where the "file" can accept the method "open" again. Transformation of a protocol state diagram into a process algebraic form is started by first replacing method names, which are transition labels in the state diagram, with method call numbers. For example, the method call numbers corresponding to the method f3 are 2 and 5 as shown in FIG. 8B, the state diagram of the class C4 in FIG. 11A is transformed into FIG. 12.

Figure 13:
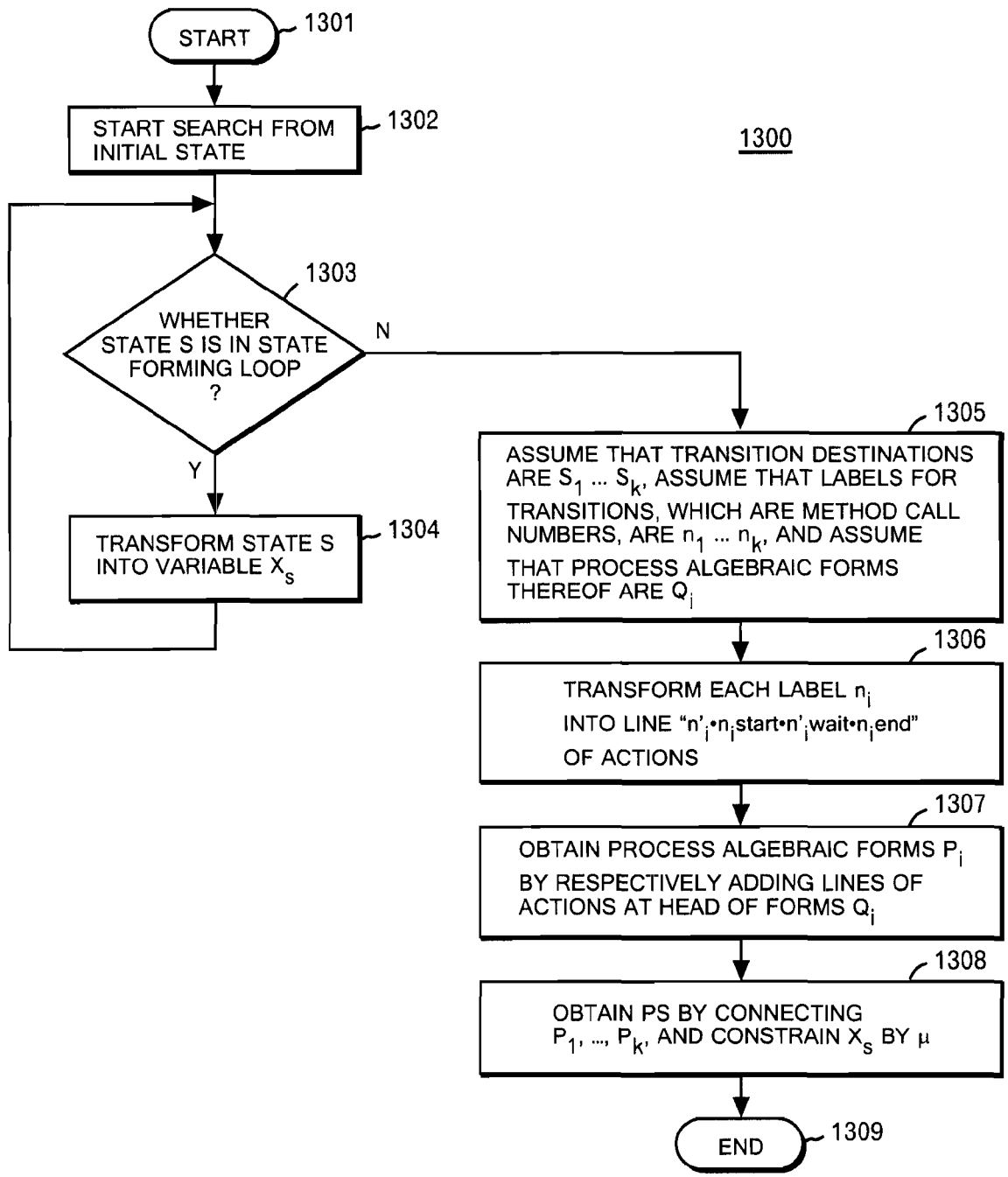
FIG. 13 shows an example of a processing flow in which the protocol state diagram is transformed into a process algebraic form.

The protocol state diagram thus transformed is further transformed into a process algebraic form by performing a depth preference search on the diagram in accordance with a processing flow 1300 of FIG. 13. The processing flow starts processing in Step 1301. In Step 1302, the search is started from an initial state of the protocol state diagram. In Step 1303, assuming that a state in the visited state diagram is a state S, it is determined whether the state S is in a state forming a loop, that is, it is determined whether there exists a state transition line which assumes the state S midway through transition from the state S, and concurrently, the state S has been visited at least once in the past. If it has been determined in Step 1303 that the state S forms a loop (YES), the state S is transformed into a variable XS in Step 1304. On the other hand, the processing advances to Step 1305 if it has been determined in Step 1303 that the state S does not form a loop (NO). In Step 1305, by assuming that states of transition destinations branched from the state S are S1, S2, . . . , Sk, and additionally assuming that labels for transitions, which are method call numbers, are n1, n2, . . . , nk (ni is an integer), the states Si of the respective transition destinations are transformed initially, and it is assumed that process algebraic forms resulting from the transformation are Qi. In Step 1306, each label ni is transformed into a line "n'i·nistart·n'iwait·niend" of actions. In Step 1307, the line of actions which is obtained by the transformation is added at the head of each of the forms Qi, and a process algebraic form Pi≡n'i·nistart·n'iwait·niend·Qi is obtained. Note that ni and n'i denote transmission of a massage and reception of a message, respectively. In Step 1308, all of Pi (i=1, 2, . . . , k) are connected by "+," whereby PS≡P1+P2+ . . . +Pk is obtained. If the state S is in a state forming a loop in Step 1308, the variable XS appearing in PS is constrained by a μ operator, and μX·PS is set to be a result of the transformation. Otherwise, PS is set to be the result of the transformation. The processing is ended in Step 1309.

Figure 12:
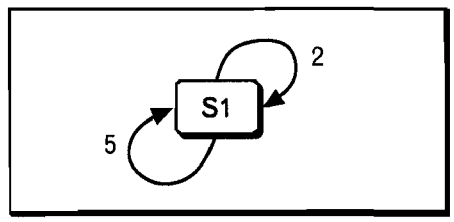
FIG. 12 shows an example of transformation of the protocol state diagram.

From the processing flow of FIG. 13, the following process algebraic form is obtained from the state diagram, for example, of FIG. 12:

$$X_S \cdot 2'_i \cdot 2_{start} \cdot 2'_{wait} \cdot 2_{end} \cdot X_{S1} + 5'_i \cdot 5_{start} \cdot 5'_{wait} \cdot 5_{end} \cdot X_{S1}.$$

Figure 14:
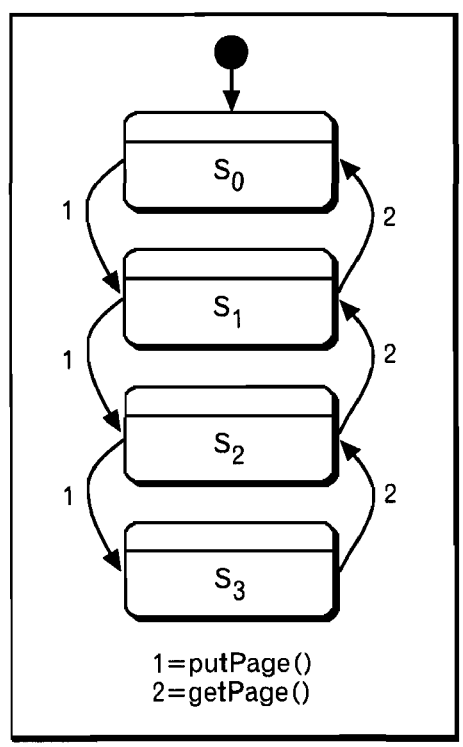
FIG. 14 shows a state diagram obtained by replacing a protocol diagram of a buffer component.

Next, in accordance with the processing flow of FIG. 13, an example of transformation of the protocol state diagram for the buffer in FIG. 6B is shown. FIG. 14 is a state diagram obtained by, based on the protocol state diagram of the buffer component in FIG. 5, replacing the transformation labels with method call numbers (putpage=1 and getPage=2) corresponding thereto. Here, if it is assumed that transformation of a state s into a process algebraic form is written as [[s]], the transformation of this state diagram follows the following manner.

Since a transition from an initial state to a state s0 is not labeled, a transformation result of the initial state is equal to a transformation result of the state S0, and $[[\bullet]]=[[S0]]$ holds.

Since S0 is a state having never been visited, and is a state forming a loop, a variable XS0 appearing in [[S1]] is constrained by μXS0. Accordingly, $[[S0]]=\mu XS0 \cdot 1' \cdot 1start \cdot 1'wait \cdot 1end[[S0]]$ is obtained. A form corresponding to a transition from S1 to S2 becomes equal to transformation of [[S0]]. The form corresponding to the transition from S1 to S2 is transformed into the variable XS0 since S0 is a state having already been visited. Accordingly, $[[S1]]=\mu XS1(1' \cdot 1start \cdot 1'wait \cdot 1end \cdot [[S2]]+2' \cdot 2start \cdot 2'wait \cdot 2end \cdot XS0)$ is obtained. $[[S2]]=\mu XS2(1' \cdot 1start \cdot 1'wait \cdot 1end \cdot [[S3]]+2' \cdot 2start \cdot 2'wait \cdot 2end \cdot XS1)$ is obtained since [[S2]] is similar to [[S1]].

[[S3]] is a form corresponding to a transition from S3 to S2. While S3 is a state forming a loop, constraint by μXS0 is not imposed since a variable XS3 does not appear in a result of [[S3]]. Accordingly, $[[S3]]=2' \cdot 2start \cdot 2'wait \cdot 2end \cdot XS2$ is obtained.

When all of the above equations are developed, the following form is obtained as a process algebraic form representing a result of transformation of the state diagram in FIG. 14:

$$BufferPSM \equiv \mu XS0.1' \cdot 1start \cdot 1'wait \cdot 1end \cdot \mu XS$$
$$1 \cdot (1' \cdot 1start \cdot 1'wait \cdot 1end \cdot \mu XS2 \cdot (1' \cdot 1start \cdot 1'wait \cdot 1end \cdot 2' \cdot 2start \cdot 2'$$
$$wait \cdot 2end \cdot XS2 + 2'i \cdot 2start \cdot 2'wait \cdot 2end \cdot XS1) +$$
$$2'i \cdot 2start \cdot 2'wait \cdot 2end \cdot XS0).$$

Next, transformation from an activity diagram into a process algebraic form will be described. An activity diagram in UML 2.0 is used as an expression describing specific behavior of a method. For this reason, one "method call number" has one activity diagram corresponding thereto. An activity diagram in UML 2.0 is defined as a directed graph formed of activity nodes and activity edges. While several-ten kinds of activity nodes are defined in the specification of UML 2.0, only a "basic action node," a "method call node," "DecisionNode and MergeNode," "ForkNode and JoinNode" and "initialNode and ActivityFinalNode," all of which directly relate to performance evaluation, are discussed here. Additionally, to each of basic actions, a time required for executing the each is annotated in accordance with notation of UML-SPT or the like.

In order to transform the activity diagram into a syntax tree of the process algebra, the following procedure is taken.

(1) By applying pre-processing to the activity diagram, the diagram is transformed into a diagram satisfying the following constraints: (i) that only one "initialNode" exists in the activity diagram; (ii) that each of the "basic action nodes" and "method call nodes" has only one incoming edge and only one outgoing edge; and (iii) that each of the "DecisionNode" and "ForkNode" has two outgoing edges.

(2) A structure, which has been obtained in (1), of the activity diagram is transformed into an expression by a syntax tree in accordance with a syntax (rules) defined in Table 2.

TABLE 2

| N | ::= | labelled node |
|---|---|---|
| | $init_1$ | initialNode |
| | $\vert (a, r)_1$ | Action with rate r |

TABLE 2-continued

| | $\vert call(N)_1$ | CallOperationAction where N is a natural number denoting a "method call number" |
|---|---|---|
| | $\vert join_1$ | JoinNode |
| | $\vert merge_1$ | MergeNode |
| A | ::= | activity |
| | $\vert Final_1$ | ActivityFinalNode |
| | $\vert Join_1$ | JoinNode |
| | $\vert FwdMerge_1$ | MergeNode |
| | $\vert BwdMerge_1$ | MergeNode |
| | $\vert N \rightarrow A$ | ControlFlow |
| | $\vert Decision(A, A)_1$ | Branching by DecisionNode |
| | $\vert Fork(A, A)_1$ | Fork by ForkNode |

(3) The tree expression obtained in (2) is transformed into a process algebraic form.

In the specification of UML 2.0, if an activity diagram has the plurality of "activity start nodes," parallel processing is started from the respective start nodes. If any one of the action nodes has a plurality of incoming edges, that node is treated in the same manner as a "JoinNode." Additionally, if any one of the action nodes has a plurality of outgoing edges, that node is defined to be treated in the same manner as a "ForkNode." Moreover, any node of the DecisionNode and ForkNode which has three or more outgoing edges can be expressed by providing DecisionNodes or ForkNodes, each of which has two outgoing edges, in multiple steps. The processing in (1) mentioned above is to insert a DecisionNode, a ForkNode and a JoinNode in appropriate locations in accordance with this definition.

Figure 15:
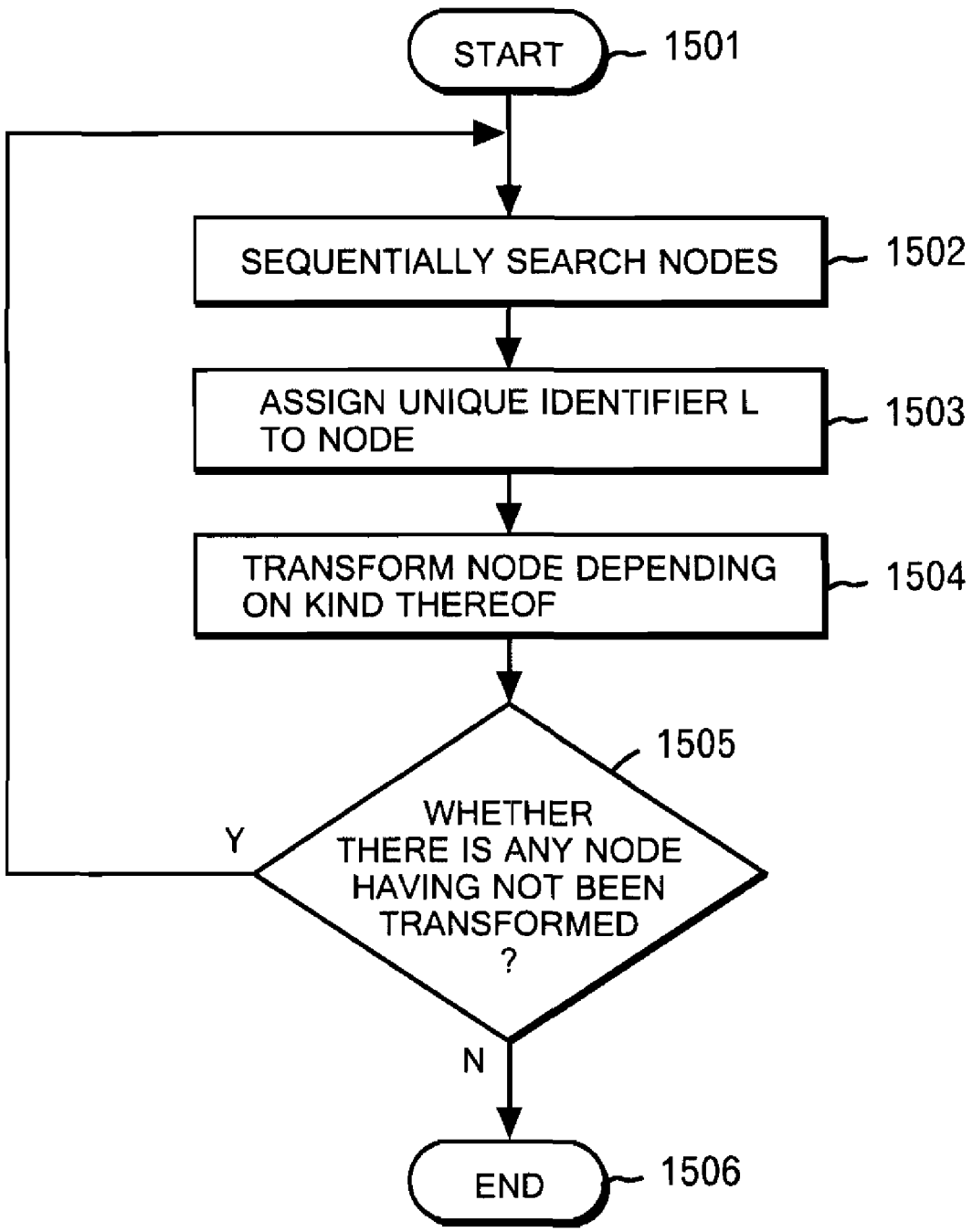
FIG. 15 shows an example of transformation into a process algebraic form from a tree expression of an activity diagram.

The transformation of the tree expression, which has been obtained in (2), of the activity diagram into a process algebraic form is executed by processing flow 1500 in FIG. 15. The processing flow 1500 starts processing in Step 1501. In Step 1502, a search is started from the initialNode. In Step 1503, a unique identifier is assigned to a node having been visited. This identifier is denoted as 1. In Step 1504, the following categorization by case is performed depending on a kind of the node having been visited, and transformation is performed with the assigned identifier 1 being added thereto.

In a case of the "ActivityFinalNode," the node is transformed into Final1.

In a case of the "initialNode," the node is transformed into init1, and then, transformation of init11 into A is performed assuming that a succeeding transformation result is denoted as A.

In a case of the "basic action node," when a time added as an annotation is denoted as t, the node is transformed into (a,1/t)1, and then, transformation of (a,1/t)1 into A is performed assuming that a succeeding transformation result is denoted as A.

In a case of the "method call node," when a method called by the node, and a "method call number" are respectively denoted as f and n, the node is transformed into call (n)1, and then, transformation of call(n)1 into A is performed assuming that a succeeding transformation result is denoted as A. In a case of the "DecisionNode," the node is transformed into Decision(A1,A2)1 assuming that succeeding transformation results are denoted as A1 and A2. In a case of the "ForkNode," the node is transformed into Fork(A1, A2)1 assuming that succeeding transformation results are denoted as A1 and A2.

In a case of the "JoinNode," the node is transformed into join1 if this node is visited for the first time, and transformation from join1 into A is performed assuming that a succeeding transformation result is denoted as A. If this node is one having been already visited, the node is transformed into join1.

In a case of the "MergeNode," the node is transformed into merge1 if this node is visited for the first time, and transformation from merge1 into A is performed assuming that a succeeding transformation result is denoted as A. If this node is one having been already visited, the node is transformed into BwdMerge1 if the node is one forming a loop, and otherwise the node is transformed into FwdMerge1.

In Step 1505, it is determined whether there is any node having not been transformed. If it has been determined in Step 1505 that there is a node having not been transformed (YES), the processing returns to Step 1502, whereby transformation processing is continued. If it has been determined in Step 1505 that there is not any node having not been transformed (NO), the processing advances to Step 1506, whereby the processing is ended.

Note that the transformation from the tree expression into the process algebraic form in above-mentioned (3) is performed in accordance with definitions in Table 3. In Table 3, in a rule of "merge1→A," a result of the transformation is stored in a memory denoted as π(1) with a label 1 being used as a key.

TABLE 3

$$[[Final_1]] = end.stop$$
$$[[Join_1]] = join_1.stop$$
$$[[BwdMerge_1]] = X_1$$
$$[[FwdMerge_1]] = \Pi(1)$$
$$[[init_1 \to A]] = [[A]]$$
$$[[(a, r)_1 \to A]] = (r).[[A]]$$
$$[[call(n)_1 \to A]] = n_{begin}.n'_{end}.[[A]]$$
$$[[merge_1 \to A]] = \mu X_1.[[A]] \text{ where } X_1 \text{ is a fresh variable}$$
$$\text{(stored as } \Pi(\overline{1}) = \mu X_1.[[A]] \text{ )}$$

$$[[join_1 \to A]] = \begin{cases} \underline{join'_1 \ldots join'_1}.[[A]] & indeg(1) > 1 \\ indeg(1) - 1 & \\ \tau.[[A]] & indeg(1) = 1 \end{cases}$$

$$[[Decision(A_1, A_2)_1]] = [[A_1]] + [[A_2]]$$
$$[[Fork(A_1, A_2)_1]] = [[A_1]] \otimes [[A_2]]$$

At the time when all of the transformations have been finished, FwdMerge1 is replaced with a corresponding process algebraic form π(1) stored in π. The following equation which appears in a rule of Fork(A1,A2)1 is an operator constructing a parallel connection of processes.

$$P \otimes Q = P/_L Q$$

$$L = \{a | a \in act(P) \hat{} a' \in act(Q) \vee a' \in act(P) \hat{} a \in act(Q)\} \quad \text{[Equation 1]}$$

The activity diagram for the putPage method of the buffer in the system described in FIGS. 7A to 7C is transformed in the following manner:

$$init_{11} \to (enqueue, 1/t3)_{12} \to Final_{13}$$

Here, (enqueue, 1/t3)12 reflects an annotation that t3 seconds are required on average in executing an action of an enqueue method. The activity diagram thus expressed is transformed into the following process algebraic form in accordance with the rules in Table 3:

$$PputPage \equiv [init_{11} \to (enqueue, 1/t3)_{12} \to Final_{13}]$$

$$= [(enqueue, 1/t3)_{12} \to Final_{13})$$

$$= (1/t3) \cdot [Final_{13}]$$

$$= (1/t3) \cdot end \cdot stop.$$

Additionally, the activity diagram for the startScan method of the Scanner component is transformed into the following tree expression:

$$init_{14} \to merge_{15} \to (scanPage, 1/t1)_{16} \to call(1)_{17} \to Merge_{15}.$$

(scanpage, 1/t1)16 reflects an annotation that t1 seconds are required on average in executing an action of a scanPage method. Additionally, call(1)17 corresponds to an action which calls putPage. The number 1 inside the parentheses is a method call number corresponding to a call by which Scanner calls putpage. A MergeNode which becomes a starting point of a loop is transformed into merge15 and Merge15, which are two elements. It is indicated that they are the same node in the original activity diagram by having the same label 15. This tree expression is transformed into a process algebraic form in the following manner:

$$P_{startScan} \equiv [init_{14} \to merge_{15} \to (scanPage, 1/t1)_{16} \to$$

$$call(1)_{17} \to Merge_{15}]$$

$$= [merge_{15} \to (scanPage, 1/t1)_{16} \to call(1)_{17} \to Merge_{15}]$$

$$= \mu X_{15}[(scanPage, 1/t1)_{16} \to call(1)_{17} \to Merge_{15}]$$

$$= \mu X_{15} \cdot (1/t1) \cdot [call(1)_{17} \to Merge_{15}]$$

$$= \mu X_{15} \cdot (1/t1) \cdot 1_{begin} \cdot 1'_{end} \cdot [Merge_{15}]$$

$$= \mu X_{15} \cdot (1/t1) \cdot 1_{begin} \cdot 1'_{end} \cdot X_{15}$$

Likewise, the following process algebraic form is obtained by the startPrint method of Printer:

$$PstartPrint \equiv \mu X_{16} \cdot 2_{begin} \cdot 2'_{end} \cdot (1/t2) \cdot X_{16}$$

Next, the merging of a protocol state diagram and activity diagrams will be described. As a last step of transformation from a class into a process algebraic from, a process algebraic form obtained from the protocol state diagram, and process algebraic forms obtained by the respective activity diagrams are merged into one. This merging is realized as follows. Here, a method call number corresponding to a certain activity diagram A is denoted as nA, and a process algebraic form resulting from transformation of the diagram A is denoted as PA. At this point, the diagram A is associated with the PA by the method call number nA, and is transformed in the following manner.

(1) "end·stop" which appears in the form PA is replaced with a process nAwait·XnA, and a result obtained by the replacement is denoted as P'A.

(2) μXnA·n'Astar is added at the head of the above result P'A, and P''A≡XnA·nAstart·P'A is obtained. After the process algebraic forms corresponding to the respective activity diagrams have been thus transformed, the process algebraic form expressing behavior of the whole class is obtained by the following parallel connection of processes:

$$C \equiv PPMS | \{n1start, n1wait, \ldots, nkstart, nkwait\}$$
$$(P''A1 | \phi P''A2 | \phi \ldots | \phi P''A k)$$

Where: PPSM denotes the process algebraic form obtained as a result of transformation of the protocol state diagram;

n1, . . . , nk denote method call numbers; and each of PAi is a transformation result of the activity diagram corresponding to the method call number i.

As an example of transformation of Buffer in the system in FIG. 4, a process algebraic form expressing behavior of the Buffer component can be obtained in the following manner. Initially, a process algebraic form PputPage obtained by an activity diagram of the putPage method is transformed in the following manner, and P"putPage is finally obtained. First of all, PputPage≡(1/t3)·end·stop holds. Here, end·stop is replaced with 1wait·X1. Consequently, P'putPage≡ (1/t3)·1wait·X1 is obtained. Next, when μX1·1' start is added to the head thereof, P"putPage≡μX1·1'start·(1/t3)·1wait·X1 is obtained. It is assumed that a similar process algebraic form P"getPage has been obtained from the getPage method. By connecting these with a process algebraic form obtained from the protocol state diagram for Buffer, BufferPSM≡μXS0·1'·1start·1'wait·1end·μXS1· (1'·1start·1'wait·1end·μXS2· (1'·1start·1wait·1end·2'·2start·2'wait·2end·XS2+ 2'2start·2'wait·2end·XS1)+2·2start·2'wait·2end·XS0), in the following manner, an process algebraic form for Buffer is obtained:

Buffer≡BufferPSM≡{1start,1wait,2start,2wait} (P"putPage|φP"getPage)

An activity of this process is as follows. Initially, a process using the buffer executes an action corresponding to a method call of Buffer. For example, it is assumed that a process of Scanner now executes an action "1." This action and an action 1' of BufferPSM are synchronized with each other, and BufferPSM executes an action 1start which follows the action 1'. In order to synchronize the action 1start with an action 1'start of P"putPage, P"putPage executes a timed action (1/t3) which follows the action 1start. Thereafter, an action 1wait of P"putPage and an action 1'wait of BufferPSM are synchronized, and BufferPSM notifies Scanner of completion of the execution by an action 1end. Concurrently, P"putPage returns to a state where it waits for being synchronized with 1'start.

A process algebraic form of the whole system can be obtained by finding process algebraic forms for Scanner and Printer are found as in the above case with Buffer, and by substituting them into a form shown in FIG. 10D:

Buffer|{1,2,1end,2end} (Scanner|φ Printer).

By using the present invention, it becomes possible for a performance developer, who has no expert knowledge on theories such as the Petri net and the process algebra which relate to performance evaluation, to perform performance evaluation based on design descriptions in UML. Thereby, a system developer can easily implement performance-related evaluation in a design phase of a system. Additionally, in the present invention, what the system developer writes are only a UML design diagram and a performance annotation. Consequently, it becomes unnecessary to prepare any specialized design model used only for performance evaluation, whereby it becomes possible to naturally introduce performance evaluation into a development process of a general system.

Although the present invention has been described hereinabove by using the embodiments, a technical scope of the present invention is not limited to the scope described in the above embodiments. It is obvious to those skilled in the art that various changes or modifications can be added to the above embodiments. It is obvious from descriptions in the scope of claims that embodiments where such changes or modifications are added to the above embodiments can also be included in the technical scope of the present invention.

Although the preferred embodiment of the present invention has been described in detail, it should be understood that various changes, substitutions and alterations can be made therein without departing from spirit and scope of the inventions as defined by the appended claims.

What is claimed is:

1. A computer program, encoded on a computer-readable recording medium, which causes a computer to transform a UML design model including protocol state diagrams and activity diagrams of classes into a stochastic performance evaluation model, the computer program causing the computer to function as:
    means for transforming a static call graph into a syntax tree having a binary tree structure;
    means for transforming each of the protocol state diagrams into a stochastic process algebraic form;
    means for transforming each of the activity diagrams into a stochastic process algebraic form;
    means for obtaining a stochastic process algebraic form of each of the classes by merging the process algebraic form of the protocol state diagram, and the stochastic process algebraic form of the activity diagram; and
    means for obtaining a stochastic algebraic form of a whole system from the syntax tree, and from the stochastic process algebraic forms of the classes.

2. The computer program according to claim 1, wherein the static call graph is a graph obtained, based on calls among the classes, from the activity diagrams.

3. The computer program according to claim 2, wherein means for producing the static call graph distinguishes calls to a single method by a difference in arguments for calling the method.

4. The computer program according to claim 2, wherein means for producing the static call graph distinguishes calls to a single method by a difference in call paths for calling the method.

5. The computer program according to claim 1, wherein the means for transforming the protocol state diagrams initially transforms a state of each of transition destinations by assuming that states of transition destinations are S1, S2, . . . , Sk, and additionally assuming that labels for transitions are n1, n2, . . . , nk, the labels being method call numbers.

6. The computer program according to claim 1, wherein the means for transforming the activity diagrams starts a search from an initialNode, and assigns a unique identifier to a node having been visited by the means.

7. The computer program according to claim 1, wherein the means for obtaining the stochastic process algebraic form of each of the classes associates the stochastic process algebraic form of the protocol state diagram with the stochastic process algebraic forms of the activity diagrams by use of method call numbers.

8. A method of transforming a UML design model including protocol state diagrams and activity diagrams of classes into a stochastic performance evaluation model, the method comprising the steps of:
    transforming a static call graph into a syntax tree having a binary tree structure;
    transforming each of the protocol state diagrams into a stochastic process algebraic form;
    transforming each of the activity diagrams into a stochastic process algebraic form;
    obtaining a stochastic process algebraic form of each of the classes by merging the process algebraic form of the protocol state diagram, and the stochastic process algebraic form of the activity diagram; and obtaining a stochastic algebraic form of a whole system from the syntax tree, and from the stochastic process algebraic forms of the classes.

9. The method according to claim 8, wherein the static call graph is a graph obtained, based on calls among the classes, from the activity diagrams.

10. The method according to claim 9, wherein, in a step of producing the static call graph, calls to a single method are distinguished from each other by a difference in arguments for calling the method.

11. The method according to claim 9, wherein, in a step of producing the static call graph, calls to a single method are distinguished from each other by a difference in call paths for calling the method.

12. The method according to claim 8, wherein, in the step of transforming the protocol state diagrams, a state of each of transition destinations is initially transformed by assuming that states of transition destinations are S1, S2, . . . , Sk, and additionally assuming that labels for transitions are n1, , n2, . . . , nk, the labels being method call numbers.

13. The method according to claim 8, wherein, in the step of transforming the activity diagrams, a search is started from an initialNode, and a unique identifier is assigned to a node having been visited in the step.

14. The method according to claim 8, wherein, in the step of obtaining the stochastic process algebraic form of each of the classes, the stochastic process algebraic form of the protocol state diagram is associated with the stochastic process algebraic forms of the activity diagrams by use of method call numbers.

15. A data processing system comprising:
a bus system;
a memory connected to the bus system, wherein the memory includes a set of instructions; and
a processing unit connected to the bus system, wherein the processing unit executes the set of instructions to transform a static call graph into a syntax tree having a binary tree structure; transform each of the protocol state diagrams into a stochastic process algebraic form; transform each of the activity diagrams into a stochastic process algebraic form; obtain a stochastic process algebraic form of each of the classes by merging the process algebraic form of the protocol state diagram, and the stochastic process algebraic form of the activity diagram; and obtain a stochastic algebraic form of a whole system from the syntax tree, and from the stochastic process algebraic forms of the classes.

* * * * *